United States Patent
Grimes

(10) Patent No.: US 8,419,922 B2
(45) Date of Patent: Apr. 16, 2013

(54) EFFICIENT PRODUCTION OF HYDROGEN

(75) Inventors: Patrick G. Grimes, Scotch Plains, NJ (US); Maureen A. Grimes, legal representative, Scotch Plains, NJ (US)

(73) Assignee: GRDC, LLC, Westfield, NJ (US)

( * ) Notice: Subject to any disclaimer, the term of this patent is extended or adjusted under 35 U.S.C. 154(b) by 888 days.

(21) Appl. No.: 11/922,736

(22) PCT Filed: Jun. 23, 2006

(86) PCT No.: PCT/US2006/024646
§ 371 (c)(1),
(2), (4) Date: Jul. 15, 2009

(87) PCT Pub. No.: WO2007/002504
PCT Pub. Date: Jan. 4, 2007

(65) Prior Publication Data
US 2009/0277800 A1 Nov. 12, 2009

Related U.S. Application Data

(60) Provisional application No. 60/693,316, filed on Jun. 23, 2005.

(51) Int. Cl.
*C25B 1/02* (2006.01)
*C01B 3/02* (2006.01)

(52) U.S. Cl.
USPC .......................... 205/637; 423/648.1

(58) Field of Classification Search ............... 205/637; 423/648.1
See application file for complete search history.

(56) References Cited

U.S. PATENT DOCUMENTS

| 1,783,901 A | 12/1930 | Bottoms |
| 2,840,450 A | 6/1958 | Giammarco |
| 2,886,405 A | 5/1959 | Benson et al. |
| 3,086,838 A | 4/1963 | Giammarco |

(Continued)

FOREIGN PATENT DOCUMENTS

| CA | 787831 A | 6/1968 |
| CA | 2144248 A1 | 12/1995 |

(Continued)

OTHER PUBLICATIONS

Office Action from corresponding Canadian Application 2,613,097, mailed Dec. 11, 2009.

(Continued)

*Primary Examiner* — Nicholas A. Smith
(74) *Attorney, Agent, or Firm* — Lerner, David, Littenberg, Krumholz & Mentlik, LLP

(57) ABSTRACT

A liquid phase process for producing hydrogen gas in a reactor comprising the step of combining at least one oxidizable reactant with liquid water and at least one alkaline electrolyte to form a mixture having a pH, wherein the pH of the mixture is substantially maintained at a value of about 10.5 or greater and conducting a reaction in the presence of an electron transfer material that permits the movement of electrons. An alternative method produces hydrogen gas from a reaction in an electrochemical cell, the reaction characterized by an overall thermodynamic energy balance and half-cell reactions occurring at each of an anode and cathode. Energy transfers, such as thermal and electric, are analyzed and controlled in order to satisfy the thermodynamic energy balance of the reaction for efficient hydrogen production.

36 Claims, 10 Drawing Sheets

U.S. PATENT DOCUMENTS

| | | | |
|---|---|---|---|
| 3,144,301 A | | 8/1964 | Mayland |
| 3,520,823 A | | 7/1970 | Slater |
| 3,799,884 A | * | 3/1974 | Young ............................ 516/96 |
| 3,959,094 A | | 5/1976 | Steinberg |
| 3,965,253 A | | 6/1976 | Miller et al. |
| 4,117,079 A | | 9/1978 | Bellows |
| 4,661,422 A | | 4/1987 | Marianowski et al. |
| 5,248,566 A | | 9/1993 | Kumar et al. |
| 5,762,658 A | | 6/1998 | Edwards et al. |
| 6,036,840 A | | 3/2000 | Christensen |
| 6,099,621 A | | 8/2000 | Ho |
| 6,387,554 B1 | | 5/2002 | Verykios et al. |
| 6,596,423 B2 | | 7/2003 | Mahajan |
| 6,605,376 B2 | | 8/2003 | Verykios et al. |
| 6,607,707 B2 | | 8/2003 | Reichman et al. |
| 6,699,457 B2 | | 3/2004 | Cortright et al. |
| 6,834,623 B2 | | 12/2004 | Cheng |
| 6,890,419 B2 | | 5/2005 | Reichman et al. |
| 6,953,873 B2 | | 10/2005 | Cortright et al. |
| 6,964,757 B2 | | 11/2005 | Cortright |
| 6,964,758 B2 | | 11/2005 | Cortright |
| 6,994,839 B2 | | 2/2006 | Reichman et al. |
| 7,056,428 B2 | * | 6/2006 | Narayanan et al. ............ 205/637 |
| 7,481,992 B2 | | 1/2009 | Reichman et al. |
| 7,485,211 B2 | * | 2/2009 | Botte et al. .................... 204/293 |
| 7,588,676 B2 | | 9/2009 | Reichman et al. |
| 2002/0132155 A1 | * | 9/2002 | Shikada et al. ................. 429/40 |
| 2003/0044349 A1 | * | 3/2003 | Reichman et al. ............ 423/650 |
| 2003/0099593 A1 | | 5/2003 | Cortright et al. |
| 2003/0194368 A1 | | 10/2003 | Devos et al. |
| 2003/0198852 A1 | | 10/2003 | Masel et al. |
| 2003/0204102 A1 | | 10/2003 | Weisbeck et al. |
| 2003/0219641 A1 | | 11/2003 | Petillo |
| 2004/0028603 A1 | | 2/2004 | Reichman et al. |
| 2004/0188248 A1 | | 9/2004 | Sawa |
| 2005/0163704 A1 | | 7/2005 | Reichman et al. |
| 2005/0163706 A1 | | 7/2005 | Reichman et al. |
| 2005/0207971 A1 | | 9/2005 | Cortright et al. |
| 2006/0188436 A1 | * | 8/2006 | Griffin ........................... 423/657 |
| 2009/0266717 A1 | | 10/2009 | Grimes et al. |

FOREIGN PATENT DOCUMENTS

| | | |
|---|---|---|
| DE | 162655 C | 9/1905 |
| EP | 0299995 A1 | 1/1989 |
| GB | 725000 A | 3/1955 |
| JP | 56146883 A | 11/1981 |
| JP | 57067003 A | 4/1982 |
| JP | 2005240064 A | 9/2005 |
| WO | 99/54950 A1 | 10/1999 |
| WO | 0204347 A1 | 1/2002 |
| WO | 03045841 A1 | 6/2003 |
| WO | WO 2004076721 A2 * | 9/2004 |
| WO | 2005028372 A2 | 3/2005 |
| WO | 2007002502 A2 | 1/2007 |
| WO | 2007002504 A1 | 1/2007 |

OTHER PUBLICATIONS

Bergens, S.H., et al., A Redox Fuel Cell That Operates with Methane as Fuel at 120° C, 1994, SCience 265:1418-1420.

Kitk-Othimer Encyclopedia of Chemical Technology, Fourth Edition, vol. 5, 1993, p. 43-53 (Carbon Dioxide), John Wiley & Sons.

Kohl, Arthur, at al., Gas Purification, Third Edition, 1979, pp. 158-161 and 187-220 (Alkaline Salt Solutions for Hydrogen Sulfide and Carbon Dioxide Absorption, Gulf Publishing Company.

Vanderborgh, N.E., et al., Methanol Fuel Processing for Low-Temperature Fuel Cells (publication information unknown).

Office Action from Corresponding Russian Application 2008102365.

International Search Report, PCT/US2006/024645.

Perry's Chemical Engineers Handbook, 7th edition, McGraw Hill, Fig. 27-52-27-59 (1997).

International Search Report, PCT/US2006/024644.

International Search Report, PCT/US2006/024646.

* cited by examiner

Effect of pH on generation rate of hydrogen at 200° C (20 wt % Pt/C catalyst, 3.5 M CH₃OH, 1L batch reactor)

Effect of pH on components in product gas generated at 200° C (20 wt % Pt/C catalyst, 3.5 M CH₃OH, 1L batch reactor)

Comparison of Catalyst Activity in 45 wt% KOH

EFFICIENT PRODUCTION OF HYDROGEN

CROSS-REFERENCE TO RELATED APPLICATIONS

This application claims the benefit of the filing date of U.S. Provisional Patent Application No. 60/693,316 filed Jun. 23, 2005, the disclosure of which is hereby incorporated herein by reference.

BACKGROUND OF THE INVENTION

Most current processes used by the chemical and energy industries, to transform chemical reactants into commercial synthesis products are thermally driven. Reactants are mixed in reactors and are heated to specific temperatures until reactor output is at a sufficient quantity or purity level to meet commercial product specifications. Often, adding catalysts to the reactor can accelerate these thermally driven processes. Reduction in processing time typically means a reduction in cost and a large volume of product ready for the market. Typically, thermally driven processes need to have process heating temperatures that are significantly higher than the theoretical reaction temperature of the specific synthesis in order to ensure that product output meets the required quantity and quality levels. Additionally, excess process temperatures are needed in order to account for heat losses from the reactor to the atmosphere, depletion of catalyst reactivity over time and heat losses in products and by-products, including steam and exhaust gases.

Often, the products produced from thermally driven processes are a mixture of desired product, and unwanted by-products, the latter sometimes as high as 50%. Undesirable chemical reactions, may occur in parallel with the target reaction in part due to excessive temperatures employed to drive the reaction. Such reactions can drain some of the thermal energy input, leaving the desired reaction with insufficient thermal energy. Additionally, the product streams from such processes typically require additional separation or purification steps to obtain the desired product. To deal with such side reactions special measures are sometimes required in order to block or slow them so that the product can be produced in sufficient quantity and at acceptable quality. Separation and purification processes also typically require additional thermal energy input and contribute to exhaust heat or other types of energy losses, thereby further reducing process efficiency. Improvements in process energy efficiency are required by the chemical and energy industries in order to generate desired products and reduce or eliminate product and energy wastes. Such wastes represent lost profit opportunities, in the form of unrecovered molecules and damage to the environment, such as greenhouse gas emissions.

In particular with regard to fossil fuels, as their supply dwindles and deleterious environmental effects fossil fuel use increases, it is becoming increasingly evident that new or improved fuels and forms of energy are needed. Significant efforts have been undertaken over the years to identify acceptable substitutes for fossil fuels. The desired attributes of a new fuel or energy source include low cost, ample supply, renewability, safety, and environmental compatibility.

The alternatives that are being explored can be divided into three broad categories: nuclear power, solar energy, and chemical fuels. In nuclear power, energy is extracted from the natural decay of radioactive elements. Although large amounts of energy are available from nuclear decay processes, the development of nuclear power has been limited because of concerns over the handling of radioactive elements and the disposal of radioactive waste. The public also worries about the possibility of runaway reactions and core meltdown during the operation of nuclear power plants.

Solar energy offers the promise of tapping the enormous energy reserves contained in the sun. The primary objective in solar energy development is the efficient collection and conversion of the energy contained in sunlight to electricity. The conversion is typically accomplished through photovoltaic devices that absorb and transform the wavelengths of light emitted by the sun. The transformation normally involves the production of electrical charge carriers via a valence band to conduction band absorption process in a semiconductor material. A desirable feature of using semiconductors to convert solar energy to electricity is the absence of pollution and the near zero maintenance requirements. Most solar energy devices are based on silicon and much research activity has been directed at optimizing the sunlight-to-electricity conversion efficiency through the development of better materials and innovative device structures. Although much progress has been made and will continue to be made in solar energy, efficiencies are currently limited to 10-15%.

Chemical fuels are a broad class of energy sources and encompass any substance capable of delivering energy through a chemical reaction. Conventional fossil fuels are included among chemical fuels and deliver energy through combustion reactions. The search for new chemical fuels is focusing on materials that combust cleanly, and at less extreme conditions than gasoline and other petroleum based fuels. The objective of, achieving clean burning fuels is directed at minimizing or eliminating environmentally undesirable by-products such as CO, $CO_2$ and NOx gases. If reaction conditions less extreme than the high temperatures required in standard internal combustion engines can be found, an opportunity exists for developing simpler and lighter weight engines that run more efficiently. Much of the work on synfuels in the 1970's and 1980's focused on developing alternative chemical fuels for combustion engines. Various hydrocarbons and oxygenated hydrocarbon compounds such as methanol have been considered. Although some promising results have been obtained, no alternative has proven sufficiently successful to motivate the costly transition from the current fuels to a new fuel source.

Hydrogen is currently the best prospect for replacing or reducing our dependence on conventional fossil fuels. The strong interest in hydrogen is a consequence of its clean burning properties and abundance. When reacted with oxygen, hydrogen produces only water as a by-product. Hence, hydrogen is an environmentally friendly fuel. Hydrogen is also the most abundant element in the universe and is contained in large amounts in many chemical compounds. Hydrogen therefore is an attractive alternative fuel source.

The realization of hydrogen as a ubiquitous source of energy ultimately depends on its economic feasibility. Economically viable methods for extracting and/or recovering hydrogen from chemical feedstocks, as well as efficient means for storing, transferring, and consuming hydrogen, are needed. The most readily available chemical feedstocks for hydrogen are organic compounds, primarily hydrocarbons and oxygenated hydrocarbons. The most common methods for obtaining hydrogen from hydrocarbons and oxygenated hydrocarbons are dehydrogenation reactions and oxidation reactions. Dehydrogenation reactions produce hydrogen by transforming saturated hydrocarbons to unsaturated hydrocarbons. Reformation reactions are a common type of oxidation reaction and involve the breaking of bonds between hydrogen and other atoms such as carbon, oxygen or nitrogen. Hydrogen atoms released upon bond breakage combine to form the desired diatomic hydrogen molecules. The broken bonds remaining on the feedstock molecules recombine or reform to produce new molecules. The reformation process is formally an oxidation reaction of the feedstock molecules.

Production of hydrogen from hydrocarbon and oxygenated hydrocarbon compounds is frequently accomplished with a steam reformation process. In steam reformation processes, a hydrocarbon (e.g., methane) or oxygenated hydrocarbon (e.g. methanol) feedstock is contacted with water in a high temperature reactor to produce hydrogen gas ($H_2$) along with carbon monoxide (CO) and/or carbon dioxide ($CO_2$). Representative hydrogen producing steam reformation reactions for a general hydrocarbon ($C_nH_m$) and a general alcohol ($C_pH_qOH$), are given below:

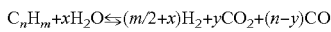

$$C_nH_m + xH_2O \leftrightarrows (m/2+x)H_2 + yCO_2 + (n-y)CO$$

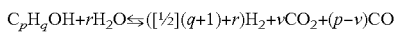

$$C_pH_qOH + rH_2O \leftrightarrows ([½](q+1)+r)H_2 + vCO_2 + (p-v)CO$$

The hydrocarbon $C_nH_m$ can be an alkane, alkene or alkyne and the group $C_pH_q$ the general alcohol can be an alkyl, alkenyl, or alkynyl group. Similar reactions can be used to describe the production of hydrogen from other oxygenated hydrocarbons such as aldehydes, ketones, and ethers. The relative amounts of $CO_2$ and CO produced depend on the specific reactant molecule, the amount of water used, and the reaction conditions (e.g. temperature and pressure).

Although the prior art steam reformation processes effectively generate hydrogen, they suffer from several drawbacks. First, the reactions are endothermic at room temperature and therefore require heating. Temperatures of several hundred degrees are needed to realize acceptable reaction rates. These temperatures are costly to provide, impose special requirements on the materials used to construct the reactors, and limit the range of applications. Second, the required high temperatures imply that steam reformation reactions occur in the gas phase. This means that hydrogen must be recovered from a mixture of gases through some means of separation. The separation means adds cost and complexity to the reformation process and make it difficult to obtain perfectly pure hydrogen. Finally, the production of $CO_2$ and/or CO is environmentally undesirable since both gases contribute to the greenhouse effect believed to be responsible for global warming.

Canadian Patent No. 787831, P. Grimes et al., teaches a liquid phase process for making hydrogen by reforming various oxidizable fuels. Liquid phase reforming can be conducted in various aqueous electrolytes but the reforming kinetics are more favorable in alkaline electrolytes, especially hydroxides. Conductive catalysts are used to promote reforming reactions by activating electrochemical pathways. Preferred catalysts are from the Group VIIIA transition metals. The following reaction describes the overall liquid phase reforming of methanol to produce hydrogen.

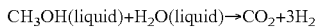

$$CH_3OH(liquid) + H_2O(liquid) \rightarrow CO_2 + 3H_2$$

The patent discloses a batch process using a mixture of water, an ionic conductive electrolyte, and an organic compound (fuel) which react in the presence of an electronic conductive catalyst, oxidizing the fuel and producing hydrogen. The reactions are said to occur, in the liquid phase and are believed to proceed via electrochemical pathways. Thus for convenience herein, this type of liquid phase reforming in alkaline electrolytes is also referred to as electrochemical reforming (ECR). Alcohol and a wide range of organic fuels, including biomass, are disclosed. High-pressure hydrogen production is disclosed and hydroxides are described as preferred electrolytes.

Recent patents to Cortright et al., U.S. Pat. Nos. 6,964,757, 6,699,457, and 6,964,758 and published U.S. Patent Application 20050207971, and Reichman et al., U.S. Pat. Nos. 6,890,419 and 6,994,839 and published U.S. Patent Application 20050163704 are similar in many respects to the disclosures in Grimes et al. These include liquid phase reforming of alcohols, sugars, biomass, hydrocarbons and various oxygenated hydrocarbons to make hydrogen. These patents and published applications disclose the use of various ionic conducting electrolytes in the liquid phase and the use of conductive metal catalysts from Group VIII and related, catalysts. The processes disclosed by Cortright et al., are conducted at ph<10, where the by-product carbon dioxide leaves as an impurity with the product hydrogen.

U.S. Pat. No. 6,607,707 discloses that hydrogen can be produced by combining an alcohol such, as methanol with a base and further in the presence of a catalyst such as a transition metal and wherein the pH of the mixture is "at least 10.3," but nothing, specific is provided beyond that limited disclosure.

U.S. Pat. No. 6,890,419 discloses an electrochemical cell consisting of anode and cathode electrodes across which an external voltage is impressed and employing acidic to strongly basic electrolyte solutions, including the use of KOH up to 12M, in order to effect production of hydrogen.

U.S. Pat. No. 6,994,839 and published U.S. Patent Application 20050163704 further disclose that alkali hydroxide electrolytes are converted in a batch process to less active alkali carbonate and bicarbonates and that the spent electrolyte can be regenerated using an energy intensive thermal process. However, this approach is economically unfavorable because the heat required to regenerate alkaline earth oxide/hydroxide reactants is significant and costly.

It is evident that a need exists for producing hydrogen from organic chemical feedstocks in an efficient, economically feasible, and environmentally friendly way. It would be desirable to have a process for producing hydrogen that is effective closer to room temperature than the current commonly used processes and that avoids or minimizes the production of environmentally harmful gases as by-products. Discovery of an acceptable process for producing hydrogen would greatly advance the cause of achieving a clean-burning economy based on hydrogen. Convenient access to hydrogen fuel, coupled to efficient technologies such as fuel cells for extracting energy from hydrogen, offers the potential to greatly reduce our current dependence on fossil fuels.

SUMMARY OF THE INVENTION

A liquid phase process for producing hydrogen gas in a reactor comprising the step of combining at least one oxidizable reactant with liquid water and at least one alkaline electrolyte to form a mixture having a pH, wherein the pH of the mixture is substantially maintained at a value of about 10.5 or greater, for example, 12 or greater, and conducting a reaction in the presence of an electron transfer material that permits the movement of electrons.

Many diverse oxidizable reactants are suitable for use in the present invention including but not limited to alkanes, alcohols, ethers, and other organic materials as well as ammonia, sulfur and hydrogen sulfide. Suitable alkaline electrolytes include compounds that ionize to produce hydroxide ions or lead to the production of hydroxide ions in the reaction mixture. Metal hydroxides are particularly preferred. Various conductive catalysts are effective in accelerating the hydrogen-producing reactions of the present invention. These include, but are not limited to, the Group VIII transition metals as well as other conductive metals, alone and in mixtures and either supported or unsupported. In a particularly preferred embodiment of the present invention, hydrogen gas is produced from the reaction of methanol in an aqueous potassium hydroxide solution at a pH of greater than about 12: and in the presence of a catalyst comprised of platinum supported on carbon.

In an alternative embodiment, a method is provided for producing hydrogen gas from an electrochemical reaction in an electrochemical cell, said reaction characterized by an overall thermodynamic energy balance and half-cell reactions occurring at each of an anode and a cathode present in said cell, comprising the steps of: (A) providing: an electrochemical cell comprising an anode, a cathode, a heat source for delivering thermal energy to one of said anode and cathode (referred to as "an anodic heat source" wherein thermal energy is delivered from said anode to said cathode, "a cathodic heat source" wherein thermal energy is delivered from said cathode to said anode or, generally with reference to either said anode or cathode or both, as "an electrode heat source"), and a thermal conductor for delivering thermal energy generated by said anode or said cathode to the other of said anode and cathode; (B) providing to said electrochemical cell at least one alkaline electrolyte, water and at least one oxidizable reactant to form a mixture having a pH; (C) providing additional thermal energy to, or removing thermal energy from one or both of said anode and cathode in order to satisfy the thermal energy requirements of said electrochemical half-cell reaction occurring at said anode and said cathode; and (D) providing a voltage between said anode and said cathode, said voltage inducing said electrochemical reaction in said electrochemical cell; and wherein: (1) said thermal energy transfers in step (A) and step (C) and said voltage in step (D) are provided or removed in amounts sufficient to satisfy said overall thermodynamic energy balance; and (2) said electrochemical method produces hydrogen gas in an energy efficient manner.

DETAILED DESCRIPTION OF THE INVENTION

Figure 1:
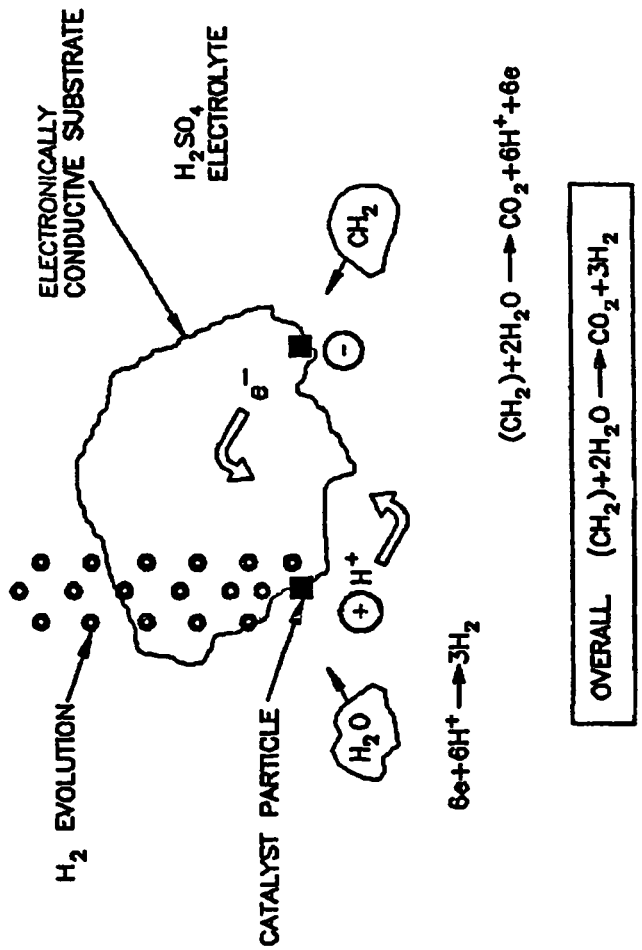
FIG. 1 is a representation of electrochemical reactions on a catalyst particle under acid conditions.

The present invention provides a method for efficiently reacting oxidizable reactants to form hydrogen gas ($H_2$). Various embodiments of the present invention comprise combining, in the liquid phase, at least one oxidizable reactant and water with at least one alkaline electrolyte under suitable pH conditions. The use of appropriate alkaline electrolyte(s) increases the pH of the combination or mixture and at sufficiently high pH values, higher than previously suggested, a surprisingly rapid reaction occurs involving hydroxide ions ($OH^-$) resulting in the production of hydrogen gas. The present invention provides for the production of hydrogen gas under conditions that efficiently use the available chemical and environmental energy in a manner that has not heretofore been accomplished.

The thermodynamic variable known as Gibbs free energy ($\Delta G$) is an indicator of whether a reaction can occur under a given set of conditions and specifically at a given temperature. In order for a reaction to occur spontaneously, including a reaction involving intermediate in situ steps, the overall reaction must have a negative $\Delta G$. On the other hand, if an overall reaction has a positive $\Delta G$, it will not occur spontaneously, but rather can occur only with the addition of a suitable amount of energy from an external source. Consequently, the preferred hydrogen reactions of the present invention exhibit a negative $\Delta G$ at that temperature or the reaction is integrated with an external source that can provide sufficient energy to result in a desirable process. Preferably, operating conditions are selected so as to provide product hydrogen gas at suitable pressures and in suitable quantities for the intended use, as well as to efficiently utilize available resources, including, for example, the use of available waste heat from related or conveniently available operations.

The present invention applies the above principles to processes for producing hydrogen using liquid-phase, oxidation-reduction, or redox, reactions. As described in detail herein, energy efficiency can be improved by appropriate selection of the combination of oxidizable reactant A, reducible reactant B, ionic conductive electrolyte and electron transfer media, as well as, when necessary, the input of one or a combination of power, work and $\Delta G$ to be supplied to a redox reactor. The oxidation-reduction reaction will then produce desired synthesized product C as well as by-product D, which itself may be useful, as further described. While an electrolyte can generally be acidic, neutral or basic, the present invention is directed to processes utilizing a basic, preferably strongly basic or alkaline, electrolyte. As will be described, the choice of the ionic conductive electrolyte, oxidizable reactant A and reducible reactant B will also influence whether the by-product D is substantially captured in the reactive mixture or become a by-product of the reaction. Efficiency can be determined as follows:

$$\text{Energy Efficiency} = \frac{\text{Useful Fuel Value Output } (C)}{\text{Fuel Value Input}} \qquad (1)$$

An alternative embodiment of free energy driven processes is to introduce at least a portion of the work required by the redox reactor in the form of electrical work. According to this embodiment, anode and cathode electrodes can be inserted in the redox reactor and function as electron transfer materials. They can be connected to an external power source in order to provide electrical potential to initiate the redox reaction. However, if the reaction temperature is to be maintained, electrical work cannot be the sole source of work input to maintain a redox reaction, since, if the reactor is isolated and insulated from external heat sources, including ambient air, the reaction mass would become increasing colder as the redox reaction continued. Consequently, for a redox reactor to maintain its working temperature access is needed to available thermal energy, $Q_1$, e.g., from the surroundings, in order to provide such thermal energy. Alternatively, the process can be operated so that electrical work is used to initiate the reaction in a redox reactor operating at ambient temperature and after the reaction is started, the electrical work can be turned off and on, reduced or used in a pulse mode depending on the production rate of the desired product.

In another mode, the redox reactor can be operated using electrical work in combination with other forms of work, power and $\Delta G$ to sustain the reaction. For example, the electrical work can be applied to initiate the oxidation-reduction reaction and to produce the synthesized product. Thereafter the electrical work input can be turned off or reduced in load, as other forms of work, power and/or $\Delta G$ bring the reactor's temperature to the require level to sustain the production rate of the product. Such phase-in of a combination of work sources can be reversed in order to slow down or shut off the reaction.

In a still further mode, a redox reactor can operate with electrical work to initiate the reaction and thereafter the electrical input can be terminated and available thermal energy, $Q_1$, from the surroundings can be used to sustain the reaction. The available thermal energy, $Q_1$, from surroundings is a heretofore unused, abundant source of free (in the economic sense) energy. This alternative provides a direct improvement over conventional, thermally driven synthesis processes, by utilizing available thermal energy from the surroundings for virtual isothermal reaction. Such a process allows the water transforming reactions described herein to proceed at lower temperatures, providing products that can contain greater energy than the original reactants. Further advantages can be realized by operating a redox process using anode and cathode electrodes. For example, the oxidation reaction will be forced to occur at the anode, thereby localizing the synthesized hydrogen gas. Conversely, the reduction reaction will be forced to occur at the cathode, localizing the by-product of the reaction. Overall, this can provide greater control of product and by-product separation. Additionally, when the redox reaction is conducted under acidic conditions, the by-product can be captured in the acidic solution. Generally, free energy processes using electrical work input, or any other, can be utilized in syntheses requiring any of the full spectrum of electrolytic conditions including acidic, neutral, buffer and basic.

Figure 2:
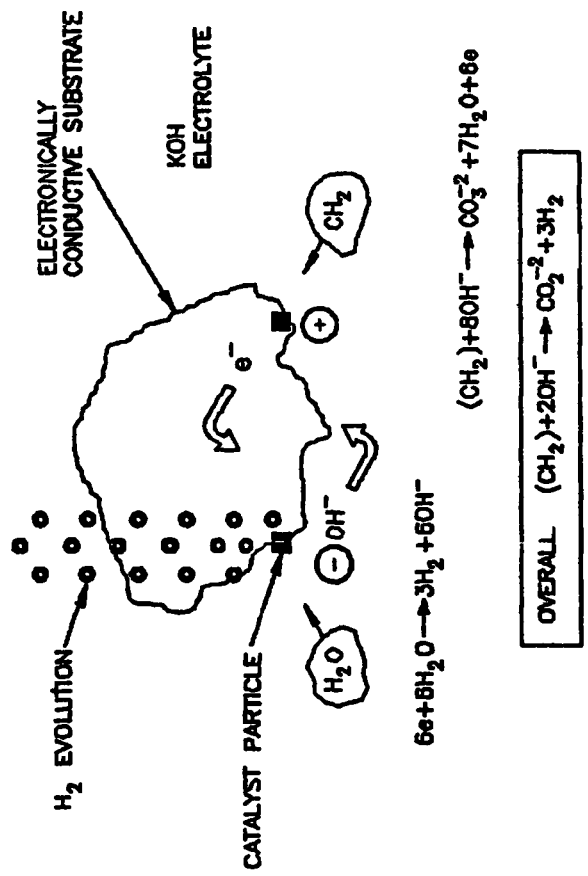
FIG. 2 is a representation of electrochemical reactions on a catalyst particle under basic conditions.

A further alternative embodiment of the free energy driven process is the use of a short-circuited anode and cathode, wherein the short circuit exists within the liquid electrolyte, in effect, creating a physical path for electron flow. Extrapolating a shorted electrode arrangement to an increasingly-smaller size extends this mode of conducting a redox process to one that is conducted on a particle, an electronically conductive particle. FIG. 1 and FIG. 2 depict a generic reaction based on a hydrocarbon "fuel" molecule including catalyst particles present on a representative electronically conductive substrate in acidic and basic solutions, respectively. A suitable electronically conductive substrate includes, or is modified by the addition of one or more catalysts on the electronically conductive substrate to enhance anodic reaction, creates thereon or therein, regions where the oxidizable substance is oxidized. Concurrently, the electronically conductive substrate allows electrons transfer. The substrate can be in the form of, but not limited to, powders, flakes, foams, fibers, and monoliths. The electrons are conducted to other regions of the electronically conductive material or to the location of negatively charged catalyst particles added for enhanced cathodic reaction will allow, or will create, reductive surfaces for the evolution of a synthesized product, such as hydrogen. Meanwhile, ions formed in the oxidative and reductive reactions, can diffuse through the ionically conductive electrolyte to other active regions of the electronically conductive material or to the locations of positively charged catalyst particles added for enhanced anodic reaction. These two transfer paths complete the circuit. In such an arrangement, the electronically conductive pathways are physically short and have low resistance. Additionally, the ionically conductive pathways are also short and the diffusion gradients are small and changing. Since this reaction is conducted in an aqueous phase, the probabilities of productive contact between reactants and the product-generating active surfaces are greatly increased compared, for example, to gas-phase reactions using catalysts typically deposited on nonconductive substrates. Furthermore, the catalysts particles added to enhance reaction rates can be layered on structures having anodically and cathodically active regions, with conductive substrates having regions of active materials. Finally, the electronically conductive substrate and the catalytically active particles added need not be separate materials, but can be catalytically active regions that are present in or on a conductive material. Given the manner in which the process of the present invention is affected by the presence of the electronically conductive substrate, the inclusion of one or more catalysts or catalytic particle is optional, but preferred, provided that the presence of such catalyst(s) is effective from an economic standpoint and/or desirably increases the rate or selectivity of product generation, for example, hydrogen.

As described in further detail hereinbelow, the processes of the present invention can be conducted with a broad range of useful oxidizable reactants in order to produce hydrogen. Several such reactants are of particular industrial interest and their reactions as characterized by Gibbs free energy, $\Delta G$, in the presence of a base are summarized in Table 1. As can be observed, several of the values for $\Delta G$ at 25° C., essentially ambient temperature, are positive and, therefore, the reactions will not proceed and produce the desired product in the absence of additional, and in some instances substantial, energy input. However, further changes in conditions, including heat input or other forms of energy input will be effective to change the thermodynamic balance of the reaction. When conditions are reached where $\Delta G$ becomes negative, the reaction can proceed and the desired product is produced. In several instances in the reaction examples shown in Table 1 below, increased temperature alone can be used to reach a negative $\Delta G$ (the temperature at which a self-sustaining reaction occurs, Tss), whereas for the ammonia reactions, additional forms of energy, suitable catalysts, etc. are apparently needed for the reaction to change from a positive to negative value of $\Delta G$. The further introduction of energy, as for example additional thermal energy, produces additional product molecules, even under essentially isothermal conditions. Therefore, it can be seen that the use of an energy source such as waste heat, typically exhausted to the environment, can be usefully employed to produce new or additional molecules. Operating at still higher temperatures can further improve the reaction, as will be demonstrated in the examples below specifically relating to the production of hydrogen from methanol.

TABLE 1

Representative Reformation Reactions (Alkaline Conditions)

| Reaction* | ΔH Kcal | ΔG Kcal | E volts | Q Kcal | Tss** ° C. |
|---|---|---|---|---|---|
| Methane | | | | | |
| OX: $CH_4 + 10OH^- \rightarrow CO_3^{-2} + 7H_2O + 8e$ | −71.99 | 134.92 | 0.732 | 62.93 | |
| R: $8e + 8H_2O \rightarrow 4H_2 + 8OH^-$ | 106.79 | 152.69 | 0.828 | −45.89 | |
| OA: $CH_4 + 2OH^- + H_2O \rightarrow 4H_2 + CO_3^{2-}$ | 34.80 | 17.77 | 0.096 | 17.04 | >375 |
| Methanol | | | | | |
| OX: $CH_3OH + 8OH^- \rightarrow CO_3^{-2} + 6H_2O + 6e$ | −72.66 | 123.62 | 0.894 | 50.96 | |
| R: $6H_2O + 6e \rightarrow 6 OH^- + 3H_2$ | 80.03 | 114.50 | 0.828 | −34.47 | |
| OA: $CH_3OH + 2OH^- \rightarrow 3H_2 + CO_3^{2-}$ | 7.37 | −9.12 | 0.066 | 16.49 | >−50 |
| Propane | | | | | |
| OX: $C_3H_8 + 26OH^- \rightarrow 3CO_3^{-2} + 17H_2O + 20e$ | 185.62 | 362.69 | 0.787 | 177.07 | |
| R: $20H_2O + 20e \rightarrow 20OH^- + 10H_2$ | 266.76 | 381.72 | 0.828 | 114.96 | |
| OA: $C_3H_8 + 6OH^- + 3H_2O \rightarrow 10H_2 + 3CO_3^{2-}$ | 81.14 | 19.03 | 0.041 | 62.11 | >125 |
| Ammonia | | | | | |
| OX: $NH_3 + 9OH^- \rightarrow NO_3^- + 6H_2O + 8e$ | 46.45 | −24.31 | 0.132 | 70.76 | |
| R: $8H_2O + 8e \rightarrow 4H_2 + 8OH^-$ | 106.70 | 152.69 | 0.828 | −45.99 | |
| OA: $NH_3 + OH^- 2H_2O \rightarrow 4H_2 + NO_3^-$ | 153.15 | 128.39 | 0.696 | 24.77 | >1000 |

*OX = oxidation half-cell reaction; R = reduction half-cell reaction; OA = overall
**Tss = Temperature of a Self Sustaining Reaction
ΔH and ΔG values calculated at 25° C., 1 atm ("HSC Chemistry Software 5.1," Outokumpu Research Oy, Pori, Finland)

As discussed immediately above, liquid phase reforming provides opportunities for significant energy benefits and efficiencies in conducting syntheses. By properly accounting for the energy requirements of the underlying reactions alternative paths to these efficiencies are available. The most direct benefit is that it may be possible to conduct the reforming reaction at a lower temperature than would otherwise have been considered. Additionally, by conducting the process in the presence of an alkaline electrolyte in an electrochemical cell reactor provides for a choice of alternative energy inputs, to drive the reaction to a negative ΔG value. For example, energy can be introduced into the reactor in the form of heat and electrical energy. One of the examples in Table 1 above has been extended to demonstrate how this approach works. In the following, table, reforming of methane in a basic system is illustrated at three different temperatures, 25° C.; 250° C. and 400° C.

In this example, liquid phase reforming of methane to produce hydrogen at 25° C., requires the calculated additional input of either 17.77 Kcal of thermal energy or 0.096 volts across the reactor cell in order to have the overall reaction achieve a negative ΔG condition. Alternatively, the energy added to the system can be a balance between thermal and electrical energy input in order to drive the overall reaction to a negative ΔG. Increasing the reforming reaction temperature to 250° C., the additional energy input required by the system to achieve a negative ΔG is reduced. According to the calculations, it is necessary to add, either 5.53 Kcal of thermal energy or 0.030 volts of electrical energy across reactor cell to reach a negative ΔG condition; alternatively, a balance between thermal and electrical input can be used. At a temperature of 400° C. or above, it is calculated that the liquid phase reforming of methane exhibits a negative value of ΔG, so that no further energy input is required. Consequently, it

TABLE 2

Alternative Methane Reforming Reactions*

| Reaction Types: | Reactions | ΔH Kcal | ΔG Kcal | E volts | Q Kcal |
|---|---|---|---|---|---|
| 25° C. | | | | | |
| Oxidation: | $CH_4 + 10OH^- \rightarrow CO_3^{-2} + 7H_2O + 8e$ | −71.99 | −134.92 | 0.732 | 62.93 |
| Reduction: | $8e + 8H_2O \rightarrow 4H_2 + 8OH^-$ | 106.79 | 152.69 | −0.828 | −45.89 |
| Overall Redox: | $CH_4 + 2OH^- + H_2O \rightarrow 4H_2 + CO_3^{-2}$ | 34.80 | 17.77 | −0.096 | 17.04 |
| 250° C. | | | | | |
| Oxidation: | $CH_4 + 10OH^- \rightarrow CO_3^{-2} + 7H_2O + 8e$ | 39.77 | −209.59 | 1.137 | 249.36 |
| Reduction: | $8e + 8H_2O \rightarrow 4H_2 + 8OH^-$ | −7.24 | 215.12 | −1.167 | −222.36 |
| Overall Redox: | $CH_4 + 2OH^- + H_2O \rightarrow 4H_2 + CO_3^{-2}$ | 32.53 | 5.53 | −0.030 | 27.00 |
| 400° C. | | | | | |
| Oxidation: | $CH_4 + 10OH^- \rightarrow CO_3^{-2} + 7H_2O + 8e$ | 288.03 | −308.13 | 1.671 | 596.16 |
| Reduction: | $8e + 8H_2O \rightarrow 4H_2 + 8OH^-$ | −258.08 | 306.24 | −2.231 | −564.32 |
| Overall Redox: | $CH_4 + 2OH^- + H_2O \rightarrow 4H_2 + CO_3^{-2}$ | 29.95 | −1.89 | −0.560 | 31.84 |

*Terms as defined in Table 1, above; ΔH and ΔG values calculated at 1 atm and at each temperature indicated for each of the three alternatives.

can be seen that a balanced approach to the energy requirements of the various reforming reactions using oxidizable reactants within the scope of the invention will lead to more efficient processes. For example, in circumstances where waste heat is available, full use can be made of such energy as one input to the reforming reaction. If the quantity of such energy is insufficient to result in a negative value for ΔG, it can be supplemented by electrical energy, each form of energy being provided in a sufficient amount to achieve a negative ΔG without unnecessarily expending new thermal energy by merely raising the reaction temperature alone. Similarly, if off-peak electrical energy is available, the balance can be shifted in that direction to achieve or maintain a negative ΔG under the circumstances and reduce the amount of thermal energy input.

It can be noted that ammonia provides another unique opportunity for generating hydrogen since ammonium salts decompose when mixed with a strong base, for example, sodium hydroxide, to yield the corresponding salt, in this instance sodium chloride, and, ammonia. Consequently, if an ammonium salt is used as the feed material to the reactor, then in the presence of a strongly alkaline composition as provided for herein, ammonia will be released in situ and will thereafter be available as the oxidizable reactant for the process of the invention. The ammonium salt can be selected from the many such salts available, giving due consideration to ΔG and the resulting by-product(s) of the reaction in view of the specific base that is employed.

The free energy processes of the present invention are typically conducted redox reactors, including batch reactors, continuous-flow reactors, stack cell reactors and other reactor systems known to those skilled in the chemical engineering process art. Continuous-flow reactors include continuous-stirred tank reactors as well as tubular reactors. The stack cell reactor configuration is typically used in applications such as polymer electrolyte membrane fuel cells, also called proton exchange membrane fuel cells (or PEM fuel cells), alkaline fuel cells and electrolysis processes. The continuous flow reactors and stack cell reactors in particular typically provide the configuration for reactants and ionic conductive electrolyte to be pumped into the reactor at necessary flow rates, as well as allowing synthesized product and by-product to flow out of the reactor.

The present invention can be conducted with at least one liquid oxidizable reactant that can be miscible, immiscible or partially miscible with water. In the case of reactants that are miscible with water, reaction(s) can occur in a homogeneous liquid phase. Without wishing to be bound by theory, it is believed that when a solid conductive catalyst is present, reactions may occur at or on the surface of such catalyst and/or at the interface between the homogeneous liquid phase and the catalyst. In the case of reactants that are immiscible with water, the reactions may occur at the interface between the immiscible phases and/or at or on the surface of the catalyst, when present. As is well known in the art, the rate of reaction between immiscible phases can be increased by increasing the interfacial contact area between the immiscible phases so that dispersing techniques such as shaking, stirring, mixing or ultrasound care expected to increase the rate of reaction between immiscible reactants and water. In the case of reactants that are partially miscible with water, the reactions may occur at the interface between or within either of the different phases and/or at or on the surface of the conductive catalyst.

Generally, the oxidizable reactant or substance includes, but is not limited to, amines, ammonia, alcohols, paraffins, alkanes, alkenes, ethers, sulfur, sulfur compounds, nitrogen, carbon, water, hydrocarbon and oxygenated hydrocarbon compounds and mixtures thereof. The oxidizable substance can be in the form a gas, liquid, slurry or other fluid form as well as mixtures of these forms. Oxidizable reactants or substances suitable for use in the present invention include saccharides, celluloses, starches, sugars, alcohols, ethers, carboxylic acids, aldehydes, ketones, biomass and biomass derived materials and mixtures of the foregoing. For example, suitable saccharides include monosaccharides, disaccharides, oligosaccharides, polysaccharides and mixtures thereof; suitable alcohols include $C_1$-$C_6$ alcohols and mixtures thereof, particularly methanol, ethanol and their mixtures; suitable ethers include dimethyl ether, methylethyl ether, diethyl ether and mixtures thereof. A particularly useful alcohol is methanol and a particularly useful ether is dimethyl ether.

The present invention can also be conducted using gaseous oxidizable reactants such as methane, ammonia and hydrogen sulfide and solid oxidizable reactants such as sulfur. Gaseous reactants can be bubbled into reaction mixture containing, for example, at least one alkaline electrolyte and water in the liquid phase, such as an aqueous solution of a base, and, without wishing to be bound by theory, it is believed that the reaction(s) may occur at the gas-liquid interface, directly in the liquid phase if the gaseous compound is soluble, or at various places at or on the surface of one or more conductive catalysts, if such catalyst is present. Hydrogen sulfide is often available as a by-product of natural gas desulfurization. Solid reactants can be introduced into the liquid phase by any convenient means well known in the art and maintained in a dispersed state by the use of, for example, mixing devices such as stirrers, impellers and the like. Sulfur sources include not only mineral deposits but also sulfur particulates separated from refinery flue gases and that obtained from natural gas desulfurization processes. Where sulfur is used as the oxidizable reactant in the present process, it is preferred that sulfur be in liquid form and that the process temperature is above about 95° C. for monoclinic sulfur and above about 113° C. for rhombic sulfur and less than about 430° C.; preferably about 120° C. to about 200° C.; more preferably about 130° C. to about 150° C.

Generally, the reducible substances are water and, carbon dioxide, which can be introduced into the redox reactor in any convenient manner. As is further described, the water can also be mixed with the ionically conductive electrolyte in the form of, for example, a solution.

If oxidizable and reducible reactants used in the processes of the present invention include impurities or contaminants, the conversion of such reactants can contribute to the buildup of residual materials in the electrolyte. Periodically, the electrolytes are preferably treated to remove the residual buildup of impurities in order to restore the quality and purity of the electrolyte.

The pH of the reactive mixture is preferably used as a gauge to establish that the alkaline electrolyte is suitable and is present at a suitable concentration. Typically, the reaction is conducted at a pH of about 10.5 or greater; preferably a pH of about 10.5 to about 16; more preferably about a pH about 11.0 to about 16; still more preferably about 12.0 to about 16; alternatively about 13.0 to about 16 or about 13.5 to about 16 or about 13.75 to about 16 or about 14.0 to about 16 or about 14.2 to about 16 or about 14.5 to about 16. For convenience, suitable pH operating values and ranges for use in the processes of the present invention can be expressed in the form of a simple equation as follows: the pH is any single pH value or range of pH values determined by the equation pH=10.5+n (0.1); wherein n=an integer of from 0 to about 55 for a single pH value or two different integers of from 0.0 to about 55 for a range of pH values and each of the calculated values is understood to include the word "about" preceding it. For example, if n=10, the pH value is about 11.5 and if two different values of n are selected such as 20 and 45, a suitable pH range is about 12.5 to about 15.

Electrolytes useful in the free energy processes of the present invention generally include alkali metals hydroxides, alkali earth metals hydroxides, organic nitrogen compounds, carbonates, phosphoric acid, hydrohalic acids, sulfuric acid, solid polymer electrolytes, ionic liquids (particularly useful in, for example, a low temperature process), and fused salts (particularly useful in, for example, a high temperature process). In the various embodiments of the present patent application, a broad range of alkaline electrolytes are suitable for processes to produce hydrogen from an oxidizable reactant. Suitable alkaline electrolytes include metal hydroxides such as KOH, NaOH, etc., and non-metal hydroxides such as ammonium hydroxide, that are capable of providing or producing hydroxide ions in a reaction mixture comprising an oxidizable reactant and water. Suitable metals of such electrolytes include, for example, alkali metals, alkaline earth metals and mixtures thereof. Particularly suitable metals of the alkaline electrolyte are selected from the group consisting of lithium, sodium, potassium, cesium, rubidium and mixtures thereof. Preferably, the electrolyte is present as an aqueous solution and/or is substantially soluble in the reaction mixture. Generally, suitable alkaline electrolytes include, but are not limited to, alkali metal hydroxides, alkaline earth hydroxides, transition metal hydroxides, post-transition metal hydroxides, lanthanide hydroxides, and organic hydroxides. Alkaline electrolytes can further, optionally, include carbonates, bicarbonates and mixtures thereof. Typically the electrolyte concentration, with reference to the reaction mixture, is about 0.5 Normal (N) to about 12 N (within solubility limits for the compound being used); preferably about 1 N to about 8 N; more preferably about 2 N to about 6 N; for example about 2 N to about 4 N; such as about 3 N.

Fresh electrolyte may need to be provided at times during the process in order to replace physical losses or reaction of the electrolyte, if any. It is also contemplated that the process of the present invention can be operated according to the disclosure provided herein and including regeneration of the alkaline electrolyte according to known methods, provided that the electrolyte is not consumed or utilized to produce an intended co-product. Depending on the pH and alkaline electrolyte selected for the process, a suitable method may be found in the patent application by R. Bellows et al., filed on even date and directed to regeneration the contents of which are incorporated herein by reference.

The electrolyte composition can optionally include at least one buffer or a mixture of buffers. Following are examples of commonly known buffers, mixtures or buffer systems, including several that are suitable for use in the present invention in view of their approximate pH of maximum buffer capacity. The breadth of effective buffering action can vary with concentration, but for concentrations approximately −0.1 molar, the average response is about ±1.0 pH unit from the value shown in Table 2:

TABLE 2

| Agent | pH |
|---|---|
| Glycocoll-sodium chloride-hydrochloric acid | 2.0 |
| Potassium acid phthalate-hydrochloric acid | 2.8 |
| Primary potassium citrate | 3.7 |

TABLE 2-continued

| Agent | pH |
|---|---|
| Acetic acid-sodium acetate | 4.6 |
| Potassium acid phthalate-sodium hydroxide | 5.0 |
| Secondary sodium citrate | 5.0 |
| Potassium acid phosphate-disodium phosphate | 6.8 |
| Potassium acid phosphate-sodium hydroxide | 6.8 |
| Boric Acid-borax | 8.5 |
| Borax | 9.2 |
| Boric acid-sodium hydroxide | 9.2 |
| Sodium bicarbonate-sodium carbonate | 10.2 |
| Disodium phosphate-sodium hydroxide | 11.5 |

Additionally, as is generally known, other combinations of weak and strong acids and bases can be combined to form buffers that can be suitable for use in the present invention.

The present invention is conducted in combination with an electron transfer material that allows the movement of electrons. Such electronically conductive substrates include conductive metals, precious metals, carbon, intermetallics, conductive titanium suboxides, conductive magnesium suboxides, carbides, nitrides, borides, ceramics and combinations thereof, including alloys and mixtures. Preferably the processes are practiced in the presence of a conductive catalyst. Conductive catalysts suitable for use in the present invention can be selected from the group consisting of compounds, complexes, alloys and mixtures thereof, comprising at least one metal selected from the Group VIII transition metals of the Periodic Table of the Elements (the Groups of elements as identified in the Periodic Table published in the CRC Handbook of Chemistry and Physics, 69$^{th}$ Ed., CRC Press, 1988). Suitable catalysts can further comprise at least one metal selected from the metals of Group IB, Group IIB, Group VIIB, and mixtures thereof. A particularly useful catalyst comprises platinum alone or further comprising a metal selected from the group consisting of copper, zinc and rhenium. Useful catalyst concentrations in the reactor, expressed in volume %, are typically about 0.1% to about 50%; preferably about 1% to about 40%; more preferably about 2% to about 2.0%. In a particularly useful embodiment, platinum is typically present at a wt % concentration of about 0.5% to about 40%; preferably about 1% to about 30%; more preferably about 5% to about 20%; for example about 10% to about 20%. In another useful embodiment, nickel is typically present at a wt % concentration of about 2% to about 100%; preferably about 25% to about 0.100%; more preferably about 40% to about 1001; for example about 60% to about 80%. Additionally, a useful form of the catalyst is where the catalyst is supported on or in a conductive or non-conductive material selected from the group consisting of metals, metal oxides, silica, alumina, silica-alumina, zirconia, titania, ceria, carbon, silicon carbide, silicon nitride, silicon boride and mixtures thereof. Furthermore, useful forms of supports include those selected from the group consisting of beads, powders, coatings on extruded substrates or monoliths and mixtures thereof.

Not wishing to be bound by theory, it is believed that the dramatic change in the production rate of hydrogen when the pH is increased from a low value to significantly higher values results from altering the reaction mechanism and the changing electromotive driving force. When the pH value changes for the solution, the reactants and products change according to the following reaction equations:

At low pH levels (<6.4):

$$CH_3OH(l) + H_2O(l) \rightarrow CO_2\uparrow + 3H_2\uparrow \quad E° = -0.016V \quad (2)$$

At middle pH levels (6.4-10.3):

$$CH_3OH(l) + OH^-(aq) + H_2O(l) \rightarrow HCO_3^-(aq) + 3H_2 \uparrow E° = +0.046V \quad (3)$$

At high pH levels (>10.3):

$$CH_3OH(l) + 2OH^-(aq) \rightarrow CO_3^{2-}(aq) + 3H_2 \uparrow E° = +0.082V \quad (4)$$

Based on these equations, the standard electromotive force rises from negative to positive when the solution changes from acidic to alkaline, which means that the reaction changes from non-spontaneous to spontaneous under standard conditions. Although the reaction (31) is not spontaneous at low pH values under standard conditions, the reaction will take place if the conditions shift away from standard conditions. When the pH of the solution reaches 14, the standard electromotive voltage has increased almost 100 mV and the reaction become thermodynamically spontaneous even at room temperature. At a high pH level, in other words, hydrogen can be generated at room temperature in the presence of methanol. In this respect, the temperature played a role in the reaction rate (kinetics role). In another respect, the raised temperature will also play a role in the reaction driving force (thermodynamic role). In the view of thermodynamics and kinetics, high pH or a high alkaline concentration is beneficial to the generation rate of hydrogen.

The scope of the present invention further provides for flexibility in the order of addition of ingredients. For example water can be combined with an oxidizable reactant before adding an alkaline electrolyte. Alternatively, water can be combined with the electrolyte before adding an oxidizable reactant. Similarly, an oxidizable reactant can be combined with an alkaline electrolyte before adding water.

The present invention allows the synthesis of hydrogen for commercial purposes to be conducted in a system that utilizes a continuous-flow reduction-oxidation or redox reactor. For example, methanol, water and KOH electrolyte can be delivered to the reactor using pumps or other standard fluid delivery devices at the necessary flow rates and pressures, such as the pressure corresponding to the pressure of the hydrogen generated in the electrochemical reforming redox reactor. The oxidation-reduction reaction rate can be further accelerated with introduction of work, power, and/or $\Delta G$ in various forms. The output of such a process is hydrogen under pressure and $CO_2$ is the by-product of the reaction. If the pH of the system is basic, the electrolyte will tend to capture the $CO_2$ as carbonate and bicarbonate ions. Depending on the design of the redox reactor, the product gas, containing hydrogen gas, vapor phase oxidizable and reduced substances from the reaction needs to be separated from the electrolyte that is exiting from the reactor. Control valves at appropriate process points, including exit lines, allow high pressure product gas to be matched to the desired end-use pressure of the hydrogen.

The reforming reaction is typically conducted such that the hydrogen is generated at elevated pressure. Typically the hydrogen pressure is about 1 atmosphere (atm) to about 200 atm; preferably about 5 atm to about 150 atm; more preferably about 10 atm. to about 100 atm. However, it can be appreciated that useful pressures for operating the process of the present invention can be determined by one skilled in the art based on the use to which the hydrogen that is produced will be put. Thus, useful pressures can be any pressure including about 1 atm to about 200 atm and all values and ranges therebetween.

Free energy can be added to the redox reactor in various alternative forms of work, power, $\Delta G$ or any combination or permutation of the three. Such forms generally include electricity, vibrational energy, including sonics such as ultrasonics, piezoelectric energy, heat, pressure, radiation, magnetic induction and combinations thereof. Creative forms of energy input can be used including, for example, the use of piezoelectric substrates coated with regions of active materials such as catalysts could produce an electric field resulting from a mechanically stressed or pulsed catalyst bed; sonics can enhance reactions and catalytic surfaces can provide direction to the reaction effects; stressing an electrolyte by pumping it through nozzles, around piping bends or introducing ultrasonic energy can increase the state of ionization of the water and shift the pH, thus enhancing the reactions on catalytic surfaces; pressure can push reactions to reduce the volume of the system and catalytic surfaces could enhance such pressure reactions.

Raising the temperature changes the level of available energy input needed. There will also be a corresponding adjustment in the quantity of thermal energy input at the higher temperature. At a sufficiently high temperature, the values in enthalpy and available energy change, the system will not require additional input of available energy and the reactions will proceed spontaneously. These temperatures are substantially less than those used for the thermal reforming of the same oxidizable substance or fuel in the gas phase. This approach can be applied over the full pH region and a wide temperature range. At neutral conditions, with only water in the system, the activity is almost nil whereas there is significant activity in the presence of basic, especially strongly basic alkaline electrolyte. As will be shown, a catenary-like curve describes the activity over the full pH range as well as over a useful temperature range. The processes of the present invention can be conducted over a broad temperature range, for example about ambient to about 350° C.; alternatively about 50° C. to about 300° C.; such as about 135° C. to about 275° C.; or about 140° C. to about 250° C.; for example about 145° C. to about 225° C.; including about 150° C. to about 220° C. Processes using sulfur as the oxidizable reactant are typically conducted in the temperature ranges discussed hereinabove.

In an alternative, preferred, embodiment the hydrogen producing reaction is conducted in an electrochemical cell. As is well-known to those skilled in the art, such a cell typically includes an anode and a cathode, or electrodes, and there is provided an electrically connective means to connect the electrodes to a voltage source, such as a power supply. Depending on the scale of production of hydrogen, the power supply will be appropriate to the scale of the electrochemical cell or cells for producing hydrogen at the desired rate. Furthermore, the cell will be provided with appropriate pumps, valves, piping, pH, temperature and pressure sensors, as well as, in the present invention, equipment for introducing heat and removing heat to and from the cell as well as to specific elements within the cell, particularly the anode and cathode, as will be explained further hereinbelow. Furthermore, the overall temperature of the cell can be controlled to a chosen level by, for example, surrounding at least a portion of the cell with appropriate heating elements, placing the cell in a controlled temperature environment, etc. Pressure is similarly controlled at a desired level for producing hydrogen at a selected pressure, as described above, provided that the cell is similarly enclosed or pressure controlled.

The electrochemical cell can be operated under conditions where the pH is acidic, neutral, buffered or basic using compounds suitable for achieving such pH conditions, as described above; in the present invention, a basic pH condition is preferred. Similarly, the oxidizable reactants described above can also be used in the electrochemical cell in order to produce hydrogen. As described earlier, for those reactions in which hydrogen is produced at one electrode, for example the cathode, and a by-product gas, for example carbon dioxide, is produced at the other electrode, the anode, there is the opportunity to take advantage of the separation and produce a purer form of hydrogen, in other words, one containing less carbon dioxide.

In one particularly preferred embodiment of the present invention, advantage is taken of the so-called half-cell reactions that take place at the cathode and anode. Prior developments in this field have not paid sufficient attention to these half-cell reactions and have, instead, focused on the overall reaction based on the conditions in the electrochemical cell. Typically the half-cell and overall reactions are affected by the pH condition of the electrolyte mixture. That mixture is obtained by mixing, either before reaching the electrochemical cell or in the electrochemical cell, the oxidizable reactant, the electrolyte itself which significantly determines the pH of the mixture, water and optionally, one or more other additives that can be included to modify the properties of the mixture, as described above. Furthermore, the half-cell reactions are affected by the overall temperature at which the electrochemical reaction is conducted or at which the cell is thermally controlled in the standard fashion, e.g., using heaters, placing the cell in an oven or furnace, use of insulation, etc.

Figure 3:
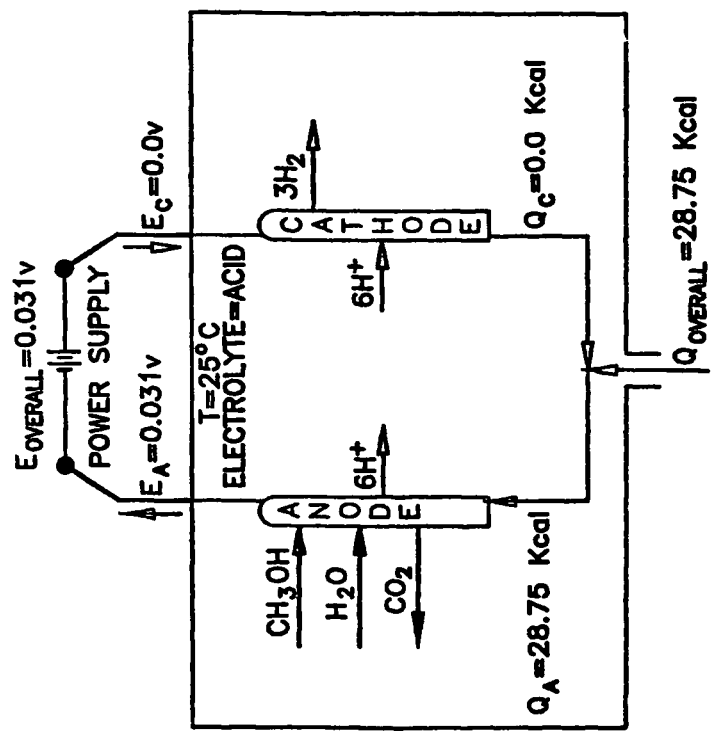
FIG. 3 illustrates an efficient, energy-directed process for hydrogen generation in an electrochemical cell under acidic conditions.
Figure 4:
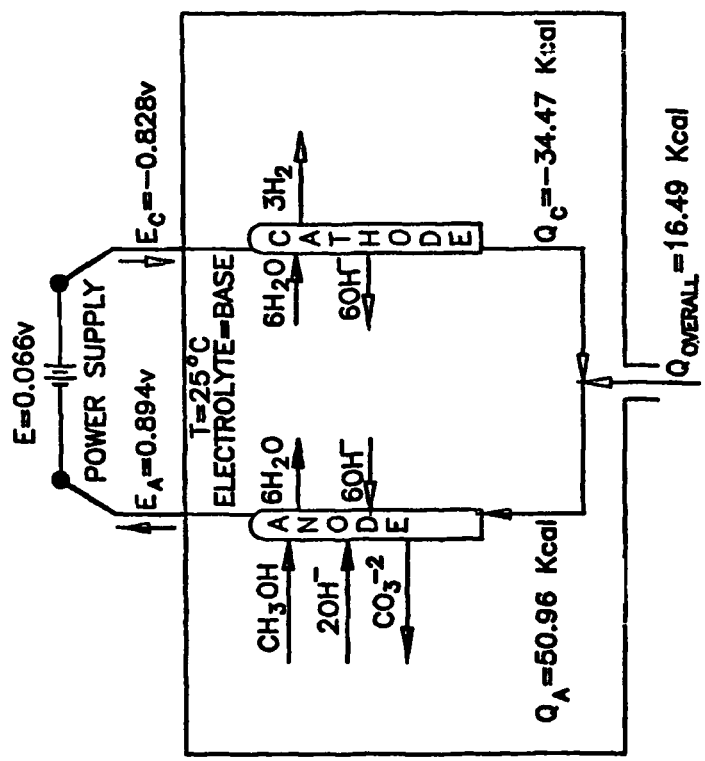
FIG. 4 illustrates an efficient, energy-directed process for hydrogen generation in an electrochemical, cell under basic conditions.

The unique benefits to be obtained by accounting for the half-cell reactions can be understood more clearly by considering specific embodiments. Commercial thermodynamic software (HSC Chemistry 5.1, Outokumpu Research Oy, Pori, Finland; distributed by ChemSW®, Inc. and ESM Software, Hamilton, Ohio) was used to evaluate and calculate the thermodynamic and chemical properties of half-cell and the overall reactions, as illustrated in FIG. 3 and FIG. 4. As described, the half-cell and overall reactions are repeated below:

$$\text{(oxidation)} CH_3OH + H_2O \rightarrow CO_2 + 6H^+ + 6e \quad (5)$$

$$\text{(Reduction)} 6H^+ + 6e \rightarrow 3H_2 \quad (6)$$

$$\text{(Overall)} CH_3OH + H_2O \rightarrow CO_2 + 3H_2 \quad (7)$$

By convention, the thermodynamic values of enthalpy, free energy, entropy and electrical potential for the half-cell reduction equation (6) are defined as zero at all temperatures. As a result, the cathode reaction neither produces nor requires heat. The thermodynamic values of other, species are calculated relative to the reduction equation (6). FIG. 3 illustrates the reformation of methanol in an electrochemical cell under acidic conditions at 25° C. (pH 0.0, methanol concentration about 1 molar in water, 1 atm. overall pressure).

As illustrated in the FIG. 3, the half-cell reaction at the cathode does not produce heat, so that it is necessary to introduce the heat required for the reaction at the anode, 28.75 Kcal, from another source. Furthermore, the (minimum) voltage required to be applied to the electrodes is shown as 0.031 volts. All of these values have been determined by use of the computer program previously referenced that calculates the thermodynamic values for each of the half-cell reactions under the stated conditions, with the resulting values having the necessary negative free energy for the overall reaction to proceed in a kinetically desirable manner.

However, attaining significant reaction rates depends upon the adequacy of the choices of electron transfer material, with or with out catalyst present, used as the electrodes, surface properties and reaction diffusion to and from the electrodes the product gas diffusion to and from the electrode, and appropriate delivery and removal of calorific values consistent with current density (as well as the overall temperature of operation of the cell, the pH of the electrolyte and the voltage impressed across the electrodes. The effects of these variables on reaction rates can be determined experimentally. However, it should be appreciated that the thermal energy required at the anode is not merely provided to the electrochemical cell in a generic fashion, but it is specifically introduced to the anode. Standard engineering methods can be used for this purpose. For example, constructing the anode to receive thermal energy by, for example, incorporating a heating element in combination with the anode structure, by including a heat transfer structure and fluid within the body of the anode where the fluid can be externally or electrically heated, etc. Where a fluid is used and heat is provided from an outside source, the heat can be in the form of waste heat obtained from associated operations, heat that would otherwise be exhausted to the atmosphere. In this way, the electrolytic mixture in the electrochemical cell can be maintained at substantially isothermal conditions while providing the required heat substantially only where it is needed, at the anode. Similarly, the voltage impressed on the cell is that which has been calculated to be required so as to maintain continuing operation of the cell at a useful hydrogen production rate. Overall, the system is in thermodynamic balance and that balance has been achieved in an efficient manner so as to reduce the amount of energy that is provided to the system while maintaining a desirable rate of product output. If the overall temperature of the system illustrated in FIG. 3 is increased to 100° C., the same half-cell and overall reactions apply, but the energy requirements are different. In this instance, the heat required at the anode increases to 33.87 Kcal and the minimum voltage applied decreases to 0.020 volts.

FIG. 4 illustrates an electrochemical cell also for producing hydrogen from methanol (at 25° C.), but in this embodiment under basic conditions. The half cell reactions are shown below:

$$\text{(oxidation)} CH_3OH + 8OH^- \rightarrow CO_3^{-2} + 6H_2O + 0.6e \quad (8)$$

$$\text{(Reduction)} 6H_2O + 6e \rightarrow 6OH^- + 3H_2 \quad (9)$$

$$\text{(Overall)} CH_3OH + 2OH^- \rightarrow CO_3^{-2} + 3H_2 \quad (10)$$

As illustrated in FIG. 4, thermal energy is produced by the half-cell reaction at the cathode (−34.47 Kcal). Rather than allowing such energy to merely increase the overall temperature of the electrochemical cell, or to rely on inefficient heat transfer through the electrolytic mixture, or to become a thermal burden requiring the need to introduce energy-intensive cooling, the thermal energy can be applied substantially directly to the anode, thereby reducing the additional thermal requirement at the anode. In this instance, it is possible, for example, to "tap into" the heat generated at the cathode, which is typically transferred quickly and effectively to the fluid immediately surrounding the cathode, by causing that fluid to flow around the anode, using internal piping, pumping, physical arrangement of the elements, etc. Since the thermal requirement at the anode is 50.96 Kcal, there is a net additional thermal requirement of 16.49 Kcal to be transferred to the anode from an external source, as described above and including waste heat sources. Additionally, according to thermodynamic calculations, the system additionally requires a net input of 0.066 volts based on 0.828 volts required at the cathode and 0.894 volts being generated at the anode in order for the half-cell reactions to be completed. As above, if the overall temperature of the electrochemical cell is increased to 100° C., the net thermal input required at the anode increases to 84.00 Kcal, comprised of 65.39 Kcal generated at the cathode and 18.6.1 Kcal introduced from another source. Similarly, the power supply, needs to provide a net of 0.094 volts based on 0.908 volts required at the cathode and production of 1.002 volts at the anode.

In the electrochemical cell embodiments of the present invention a suitable voltage to be impressed across the electrodes is calculated as described above, also considering the several variables discussed above. The magnitude of the voltage value suitable for use in the present invention is typically a value selected from the group of values consisting Of: less than about 10 V; less than about 1.0 V; less than about 0.5 V; and less than about 0.1 V. In other words, the voltage is typically greater than zero and less than the maximum values recited, with a useful value being calculated as described above and then the value used in a specific cell being the same as the calculated value or a modification thereof in response to the actual results when the cell is put into operation. In other words, the calculated value can be used as a starting point and one skilled in the art can adjust that value as conditions suggest.

Similarly, the range of pH values suitable for use in the electrochemical cell process embodiment of the present invention are somewhat broader than those described above in view of the controlled use and transfer of energy in such a cell system. Useful pH levels will be determined, in part, by selection of the oxidizable reactant as well as on the chemical nature of the electrolyte, etc. The pH of the electrolyte mixture in the cell can also be used as a gauge to establish that the alkaline electrolyte is suitable and is present at a suitable concentration. Typically, the reaction is conducted at a pH of about 7 or greater; preferably a pH of about 8.5 to about 16; more preferably about a pH about 9.5 to about 16; still more preferably about 10.5 to about 16; alternatively about 11.5 to about 16 or about 12.5 to about 16 or about 13.5 to about 16 or about 14.0 to about 16 or about 14.5 to about 16 or about 15 to about 16. For convenience, suitable pH operating values and ranges for use in the processes of the present invention can be expressed in the form of a simple equation as follows: a suitable pH is any single pH value or range of pH values determined by the equation $pH = \geq 7 + n(0.1)$; wherein n an integer of from 0 to about 90 for a single pH value or two different integers of from 0 to about 90 for a range of pH values and each of the calculated values is understood to include the word "about" preceding it. For example, if n=5, the pH value is about 7.5 and if two different values of n are selected such as 20 and 45, a suitable pH range is about 9 to about 11.5.

In each instance where energy is needed at the anode or the cathode for the desired reaction to be accomplished, for example, based on the type and concentration of oxidizable reactant being used, the pH conditions in the cell, the overall operating temperature, etc., that energy is specifically directed to accomplish a more efficient process. This type of energy-directed process has not heretofore been applied to hydrogen generation in electrochemical cells and once having been described herein, the beneficial results are clear. As discussed above, the various oxidizable reactants described can be used in this process, in each instance adjusting the heat transfer conditions for the half-cell reactions at the anode and cathode according to the thermodynamic calculations as well as adjusting the power supplied to the cell and choosing a convenient overall operating temperature and pressure, the latter determined by the end-use to which the hydrogen is to be put. Depending on the reactants and other conditions as described above, it is envisioned that thermal energy may be generated at the anode or the cathode, and overall thermal energy may need to be transferred into the cell or removed. These actions can be accomplished by standard heat transfer techniques well-known to those skilled in the art. Once-having established these conditions, the cell can be efficiently operated at substantially isothermal conditions.

The following examples are provided as specific illustrations of embodiments of the claimed invention. It should be understood, however, that the invention is not limited to the specific details set forth in the examples. All parts and percentages in the examples, as well as in the specification, are by weight unless otherwise specified. Furthermore, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R = R_L + k(R_U - R_L)$, where k is a variable ranging from 1% to 100% with a 1% increment, e.g., k is 1%, 2%, 3%, 4%, 5%, ... 50%, 51%, 52%, ... 95%, 96%, 97%, 98%, 99%, or 100%. Moreover, any numerical range represented by any two values of R, as calculated above is also specifically disclosed.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements or methods steps.

As used throughout the specification, including the described embodiments, the singular forms "a," an," and "the" include plural referents unless the context clearly dictates otherwise. Thus, for example, reference to "an oxidizable fuel" includes a single fuel as well a two or more different fuels in combination, reference to "a metal hydroxide" includes mixtures of two or more metal hydroxides as well as a single metal hydroxide, and the like.

The term "about" encompasses greater and lesser values than those specifically recited provided that the value of the relevant property or condition facilitates reasonably meeting the technologic objective(s) of the present invention as described in detail in the specification and claims. More specifically, the term "about" when used as a modifier for, or in conjunction with, a variable, is intended to convey that the numbers and ranges disclosed herein are flexible and that practice of the present invention by those skilled in the art using, for example, concentrations, amounts, contents, carbon numbers, temperatures, pressures, properties such as density, purity, etc., that are outside of a stated range or different from a single value, will achieve the desired result, namely, the efficient production of hydrogen.

EXAMPLES

Example 1

Figure 5:
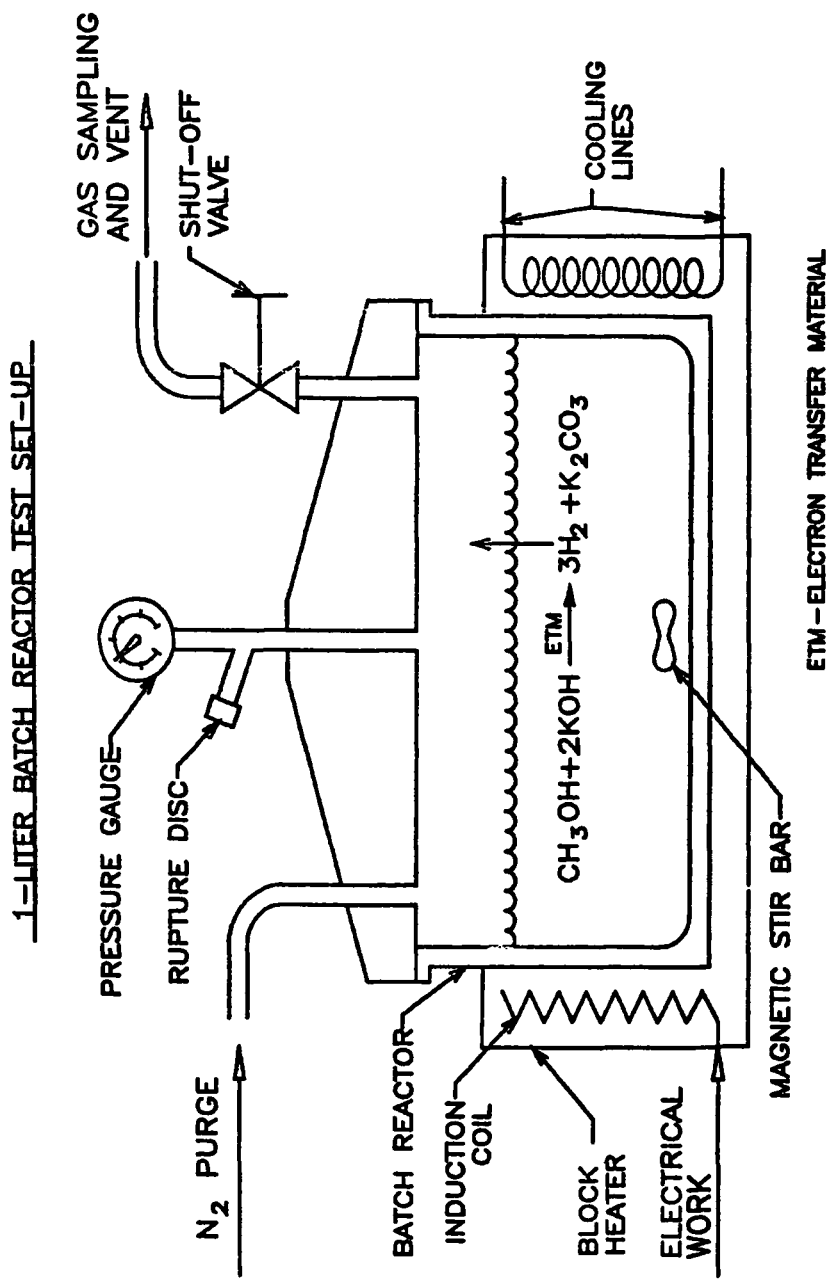
FIG. 5 is a schematic representation of a one-liter batch reactor test setup for controlled testing of oxidizable reactant, reducible reactant, electrolyte and electron transfer material.
Figure 6:
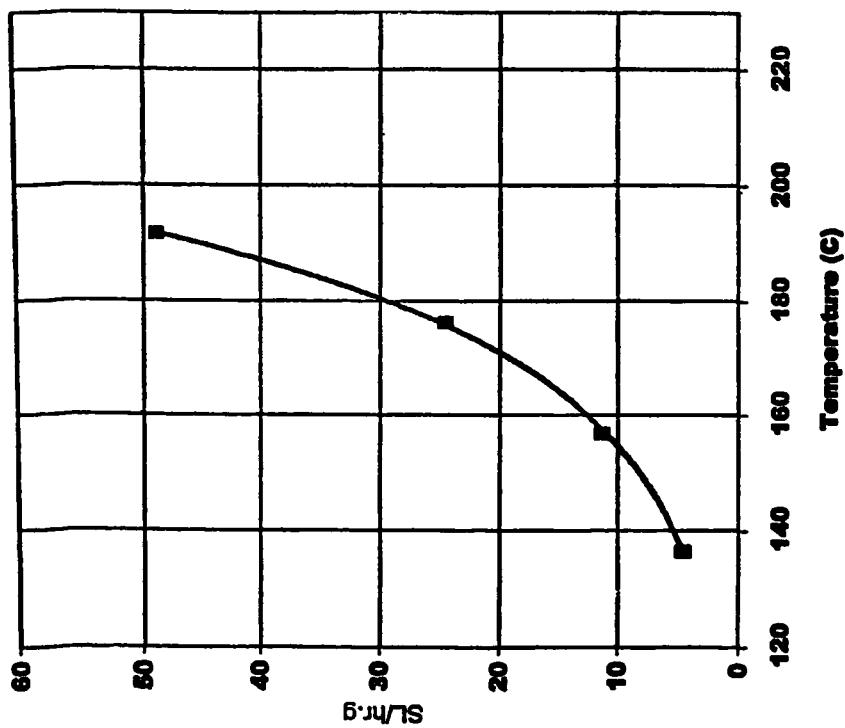
FIG. 6 illustrates the effect of temperature on the hydrogen generation rate using aqueous methanol oxidizable reactants, KOH electrolyte and a platinum catalyst.

As illustrated in FIG. 5, a one-liter batch reactor was constructed to allow for the insertion of oxidizable reactant, reducible reactant, electrolyte and electron transfer material. The reactor was surrounded by a block heater to transfer heat to the solution in the reactor through conduction. In the following experiments, the oxidizable reactant was methanol and 45% wt KOH in water was used as a combined reducible reactant and electrolyte. Various electron transfer materials (with or without catalyst(s) present) in the form of powders, flakes and foam were used. The synthesized hydrogen accumulated in the void space above the solution. The pressure inside the reactor was measured and used to calculate the hydrogen generation rate expressed as standard liters per hour-gram (SL/hr-g) of electron transfer material, excluding support, if any. Hydrogen gas was sampled and analyzed in a gas chromatograph (GC) to verify product purity and selectivity of electron transfer material (with or without catalyst(s) present). The data illustrated in FIG. 6 are based on a system using 45% KOH (250 ml) and methanol (40 ml) with 200 mg of a supported platinum catalyst (B-Tek, Inc., Somerset, N.J.); 20 wt % Pt; 128 m$^2$/g surface area; Vulcan XC-72 support). As discussed above, temperature was shown to have a strong effect on the hydrogen generation rate.

Example 2

Figure 7:
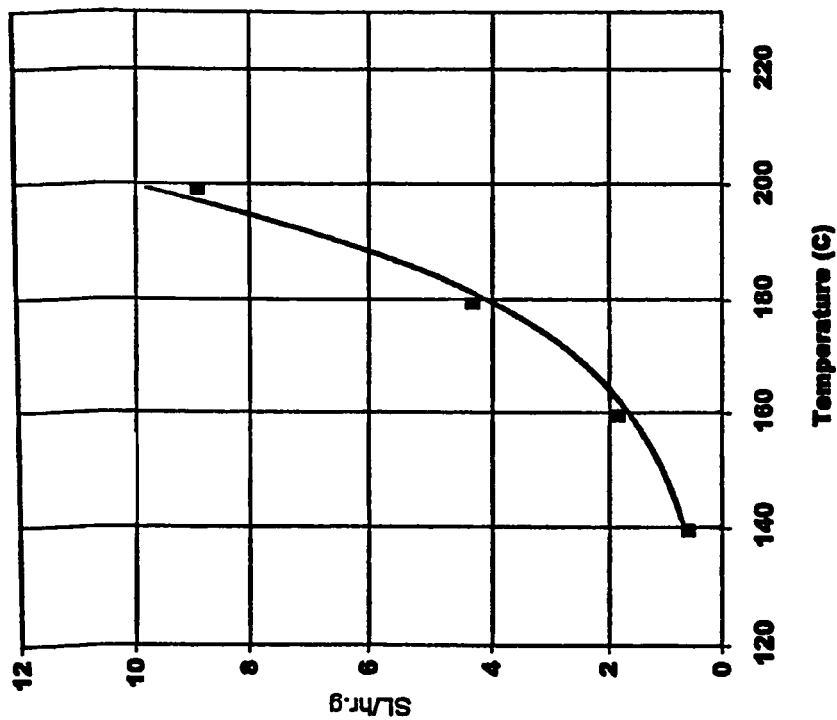
FIG. 7 illustrates the effect of temperature on the hydrogen generation rate using aqueous methanol oxidizable reactants, KOH electrolyte and a Raney Nickels 2800 catalyst.

In this example using the same experimental setup as described above was used including 250 ml 45% KOH and 40 ml methanol as the fuel. However, the catalyst was changed to Raney Nickel® 2800. The effect of temperature on the hydrogen generation rate is also illustrated in FIG. 7. Testing up to 200° C., the hydrogen generation rate is again exponentially proportional to the temperature, although the production rate is reduced compared to the catalyst in Example 1.

Example 3

Figure 8:
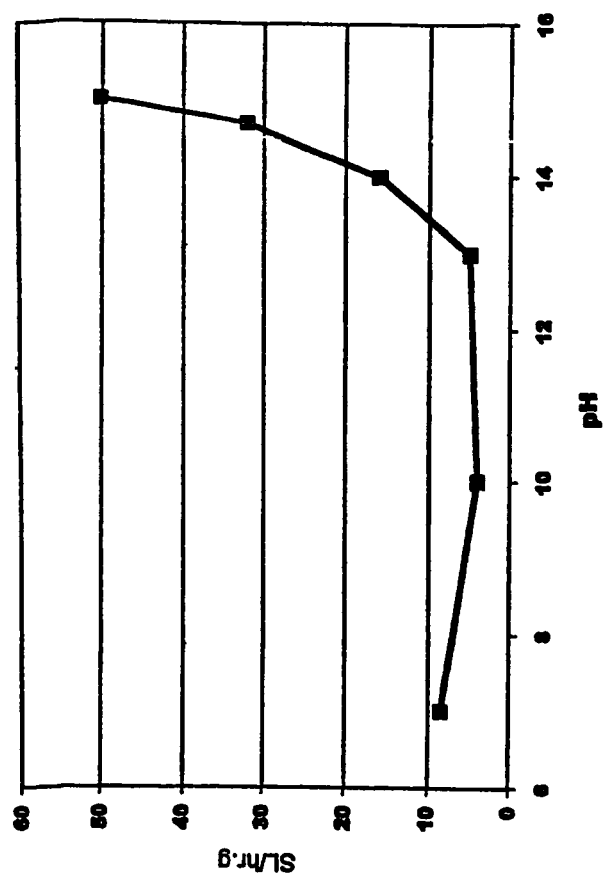
FIG. 8 illustrates the effect of pH on the hydrogen generation rate at 200° C. using aqueous methanol oxidizable reactants and a platinum on carbon catalyst.

Further experiments were conducted to determine the effect of pH on the hydrogen generation rate and as well as the composition of the product gas. These experiments were conducted 200° C. and the concentration of hydroxide was altered to vary the pH; the catalyst was supported platinum as described in Example 1. As shown in FIG. 8, the generation rate of hydrogen is five to six times higher in the concentrated alkaline solution than in diluted low pH solutions.

Figure 9:
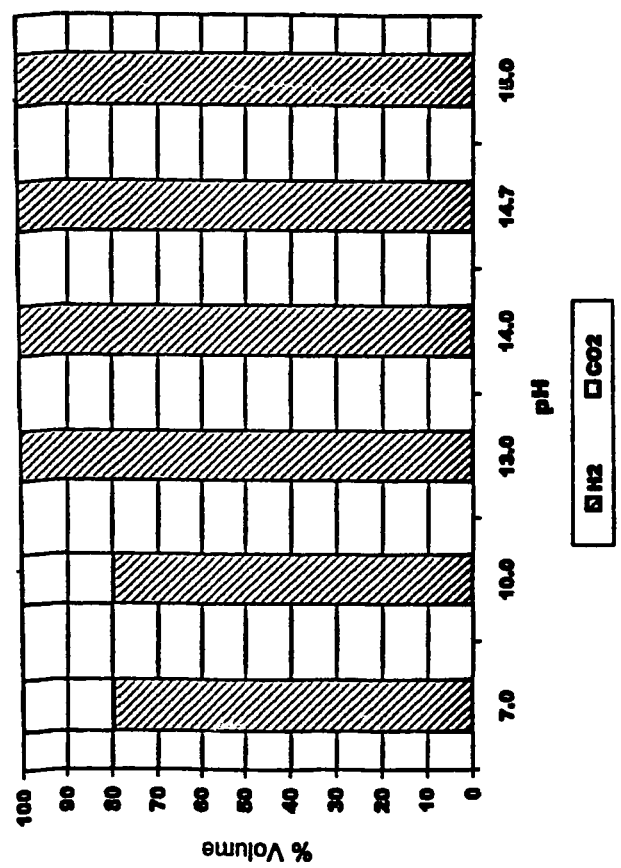
FIG. 9 illustrates the effect of pH on amount of by-product $CO_2$ gas that is mixed with desired product $H_2$ when the process is conducted according to the present invention.

The effect of pH on amount of by-product $CO_2$ gas that is mixed with desired product $H_2$ for the same reactants and temperature as shown in FIG. 9. At pH of 7 and 10 more than 20% of the product gas was $CO_2$, whereas at pH of 14.7 and 15, product $H_2$ gas was analyzed and it did not contain any CON.

Figure 10:
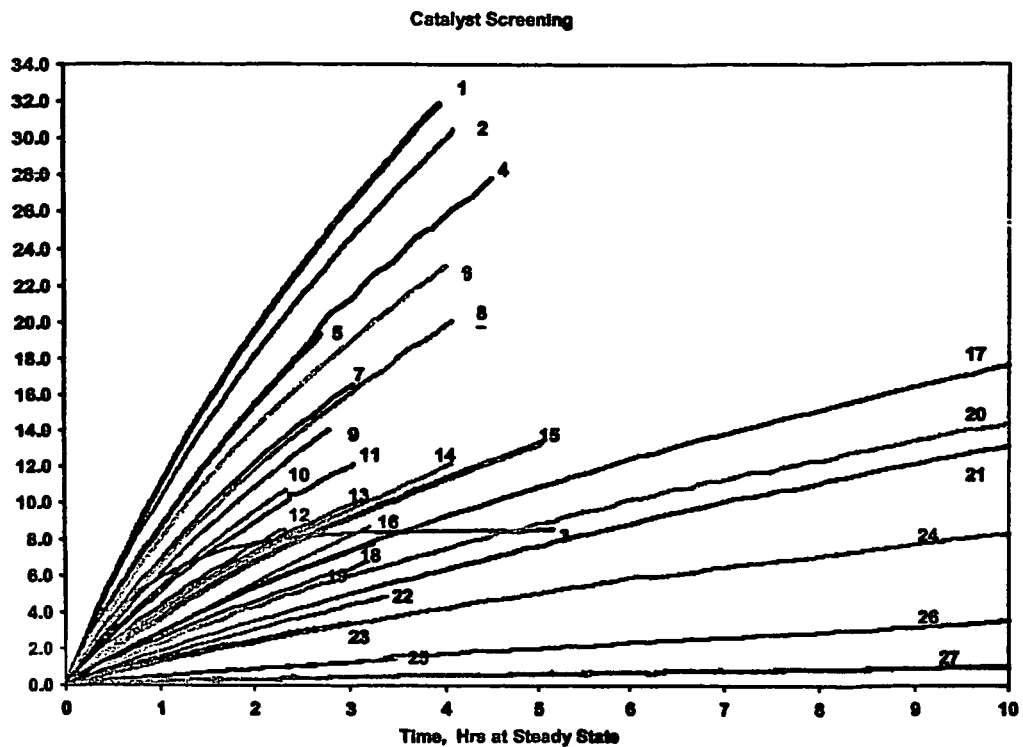
FIG. 10 illustrates the hydrogen generation performance of various electron transfer materials tested in the one-liter batch reactor.

FIG. 10 illustrates the results for the synthesis of hydrogen from methanol and water in KOH electrolyte using various catalysts as electron transfer materials enclosed in the 1-liter batch reactor illustrated in FIG. 5. Mixtures of methanol, aqueous caustic electrolytes and electron transfer material (with or without catalysts(s) present) were initially charged into a reaction vessel which was then sealed. The vessel was heated to reaction temperatures between 140° C. and 200° C. Kinetics were measured based on the increase in pressure caused by evolution of hydrogen. Gas chromatography (GC) analysis of the product gases using potassium hydroxide typically showed high purity hydrogen with only trace amounts (less than 1000 ppm) of carbon monoxide, carbon dioxide or methane. A wet test meter (WTM) was used to monitor the amount of hydrogen gas evolved.

FIG. 10 compares the activity of these various electron transfer materials. The results are presented as hydrogen pressure increase after the reactor was heated to a steady state temperature of 200° C. All tests utilized substantially the same charge, 40 ml methanol and 250 ml 45 wt % KOH (except for curve 3), so that the pressure curves are comparable as a function of catalyst loading and catalyst type. The electron transfer materials tested are summarized in the legend beneath the figure. The experiments demonstrated that platinum catalysts exhibited the highest activity. Even so, there was considerable overlap in activity between the lowest platinum containing catalysts and the highest nickel containing catalysts. Since platinum is about 1000 times more expensive than nickel, a nickel catalyst can be more cost-effective in a particular process embodiment. Amongst both of the catalyst groups or samples including platinum or nickel, the higher catalyst surface area generally correlated with higher activity. However, higher activity per unit surface area was generally observed with low surface area particles. This observation is generally consistent with the understanding that an internal diffusion, mass transfer limitation within the catalyst particles can affect catalyst performance. This suggests that high surface area catalysts are most active when using small particle size catalysts and may also suggest that a nickel slurry catalyst as the most cost-effective on the other hand, an experiment using Raney nickel exhibited an exceptionally high activity per unit surface area. In one of the experiments represented by curve 3, the amount of oxidizable reactant (methanol) relative to platinum catalyst, was significantly decreased in order to demonstrate that in the reforming reaction the reactant can be substantially completely reformed. Complete reformation was achieved in this experiment, but since the amount of methanol present was less than in the other experiments, the total amount of hydrogen produced (and consequently its pressure) was less, resulting in a pressure curve having a distinctly different appearance.

The catalysts include commercial nickel powders, flakes, foam, Pt/Ni spheres and Ag/Ni from Novamet. Commercial Raney Ni 2800, 20% Pt/C, methanol and 45% KOH solution were obtained from commercial sources (Sigma-Aldrich Company and Alfa Company). The curves identified as 3, 5, 14-16 and 21 utilized precious metal catalysts that were deposited from salts on commercial substrates. Catalyst selectivity and generation rates were measured and the fuel conversion was calculated.

All documents, including patents, described herein are incorporated by reference herein, including any priority documents and/or testing procedures. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A liquid phase oxidation-reduction process for producing hydrogen gas in a continuous flow reactor comprising the step of combining at least one oxidizable reactant with liquid water and at least one alkaline electrolyte to form a reaction mixture having a pH, wherein the pH of the mixture is maintained during a reaction of the reaction mixture at a constant value of about 10.5 or greater and conducting the reaction in the presence of an electron transfer material that permits the movement of electrons.

2. The process of claim 1 wherein the pH is any single pH value or range of pH values determined by the equation pH=10.5+n(0.1); wherein n=an integer of from 0 to about 55 for a single pH value or two different integers of from 0 to about 55 for a range of pH values, and wherein each of the calculated values is understood to include the word "about" preceding it.

3. The process of claim 1 wherein the pH is about 11.0 to about 16.

4. The process of claim 1 conducted at a temperature of about ambient to about 350° C. and at a pressure sufficient for at least a portion of the water to be in the liquid phase.

5. The process of claim 1 wherein the electron transfer material is selected from the group consisting of conductive metals, precious metals, carbon, intermetallics, conductive titanium suboxides, conductive magnesium suboxides, carbides, nitrides, borides, ceramics and combinations thereof.

6. The process of claim 1 wherein the mixture further comprises at least one conductive catalyst selected from the group consisting of compounds, complexes, alloys and mixtures thereof comprising at least one metal selected from the group consisting of the Group VIII transition metals of the Periodic Table of the Elements and mixtures thereof; said catalyst optionally further comprising at least one metal selected from the metals of Group IB, Group IIB, Group VIIB, and mixtures thereof.

7. The process of claim 6, wherein the catalyst is selected from the group consisting of platinum, nickel, palladium, iron, cobalt, iridium, ruthenium and mixtures thereof; said catalyst optionally further comprising a metal selected from the group consisting of copper, zinc, silver and rhenium.

8. The process of claim 6, wherein the catalyst is supported on or in a conductive or non-conductive material selected from the group consisting of metals, metal oxides, silica, alumina, silica-alumina, zirconia, titania, ceria, carbon, silicon carbide, silicon nitride, silicon boride and mixtures thereof; said support optionally in a form selected from the group consisting of beads, powders, flakes, coatings extended substrates, monoliths and mixtures thereof.

9. The process of claim 1, wherein the alkaline electrolyte is selected from the group consisting of ammonium hydroxide; alkali metal or alkaline earth metal: hydroxides, carbonates or bicarbonates; and mixtures thereof.

10. The process of claim 1, wherein the oxidizable reactant is selected from the group consisting of a saccharides, celluloses, starches, sugars, alcohols, ethers, carboxylic acids, $C_1$ to $C_4$ alkanes, aldehydes, ketones, ammonia, sulfur, hydrogen sulfide, hydrocarbons, oxygenated hydrocarbons, biomass, nitrogen and mixtures thereof.

11. The process of claim 10, wherein said alcohol is selected from the group consisting of $C_1$-$C_6$ alcohols and mixtures thereof; and wherein said ether is selected from dimethyl ether, methylethyl ether, diethyl ether and mixtures thereof.

12. The process of claim 10, wherein the oxidizable reactant is a mixture of methanol and dimethyl ether.

13. The process of claim 10 wherein the oxidizable reactant is sulfur in either (1) monoclinic form and the process is conducted at a temperature of greater than about 95° C. to less than about 430° C.; or (2) rhombic form and the process is conducted at a temperature of greater than about 113° C. to less than about 430° C.

14. The process of claim 1 further including a step of generating the oxidizable reactant in situ.

15. The process of claim 14 further including a step of introducing an ammonium salt into the reactor and controlling the pH at a level sufficient to effect decomposition of the ammonium salt, thereby generating ammonia.

16. The process of claim 1, wherein said reactor is a stack cell reactor.

17. The process of claim 1, wherein said continuous-flow reactor is selected from the group consisting of continuous-stirred tank reactors, tubular reactors and stack cell reactors, wherein said reactor provides a configuration for reactants and ionic conductive electrolyte to be pumped into said reactor at suitable flow rates and provides for synthesized product and by-product to flow out of said reactor.

18. The process of claim 1, further comprising addition of energy to said reactor in a form selected from the group consisting of electricity, heat, pressure, sonic energy, ultrasonic energy, piezoelectric energy, radiation, magnetic induction and combinations thereof.

19. The process of claim 1 wherein said mixture further comprises at least one buffering agent.

20. A method for producing hydrogen gas from an electrochemical reaction in a continuous flow electrochemical cell reactor, said reaction characterized by an overall thermodynamic energy balance and half-cell reactions occurring at each of an anode and cathode present in said cell reactor, comprising the steps (A), (B), (C) and (D):

(A) providing a continuous flow electrochemical cell reactor comprising at least one each of an anode and a cathode; a heat source for delivering thermal energy to one of said anode and cathode (referred to as "an anodic heat source" wherein thermal energy is delivered from said anode to said cathode, "a cathodic heat source" wherein thermal energy is delivered from said cathode to said anode or, generally with reference to either said anode or cathode or both, as "an electrode heat source"); and a thermal conductor for delivering thermal energy generated by said anode or said cathode to the other of said anode and cathode;

(B) providing to said electrochemical cell reactor at least one alkaline electrolyte, water and at least one oxidizable reactant to form a reaction mixture having a pH, wherein the pH of the mixture is maintained during said reaction at a constant value of about 10.5 or greater;

(C) providing additional thermal energy to, or removing thermal energy from one or both of said anode and cathode in order to satisfy the thermal energy requirements of said electrochemical half-cell reaction occurring at said anode and said cathode; and (D) providing a voltage between said anode and said cathode, said voltage inducing said electrochemical reaction in said electrochemical cell reactor; and wherein:
  (1) said thermal energy transfers in step (A) and step (C) and said voltage in step (D) are provided or removed in amounts sufficient to satisfy said overall thermodynamic energy balance; and
  (2) said electrochemical reaction produces hydrogen gas in an energy efficient manner.

21. The method of claim 20 wherein (a) said cathodic heat source is thermal energy generated by the electrochemical reaction at the cathode, and said thermal energy is delivered to the anode; or wherein (b) said anodic heat source is thermal energy generated by the electrochemical reaction at the anode, and said thermal energy is delivered to the cathode; or both (a) and (b).

22. The method of claim 21 wherein additional thermal energy not generated by said reaction is provided to (a) said anode; or (b) said cathode or both (a) and (b).

23. The method of claim 20 wherein the pH is any single pH value or range of pH values determined by the equation pH=10.5+n(0.1); wherein n=an integer of from 0 to about 90 for a single pH value or two different integers of from 0 to about 90 for a range of pH values, and wherein each of the calculated values is understood to include the word "about" preceding it.

24. The process of claim 20 wherein the pH is a value in a range selected from the group consisting of: greater than about 10.5 to about 16; about 11 to about 16; about 12 to about 16; about 13 to about 16; about 14 to about 16; and any one of about 10.5, about 11.5, and about 12.5 to about 16.

25. The process of claim 20 conducted at a temperature selected from the group consisting of about 25° C. to about 350° C., about 50° C. to about 300° C., about 135° C. to about 275° C., about 140° C. to about 250° C., about 145° C. to about 225° C., and about 150° C. to about 220° C.; and at a pressure sufficient for at least a portion of the water to be in the liquid phase.

26. The method of claim 20, wherein the magnitude of said voltage is a value selected from the group of values consisting of: less than about 10 V; less than about 1.0 V; less than about 0.5 V; and less than about 0.1 V.

27. The process of claim 20, wherein said alkaline electrolyte is selected from the group consisting of ammonium hydroxide; alkali metal or alkaline earth metal: hydroxides, carbonates or bicarbonates; and mixtures thereof.

28. The process of claim 20, wherein the oxidizable reactant is selected from the group consisting of a saccharides, celluloses, starches, sugars, alcohols, ethers, carboxylic acids, $C_1$ to $C_4$ alkanes, aldehydes, ketones, ammonia, sulfur, hydrogen sulfide, hydrocarbons, oxygenated hydrocarbons, biomass, nitrogen and mixtures thereof.

29. The process of claim 28, wherein said alcohol is selected from the group consisting of $C_1$-$C_6$ alcohols and mixtures thereof; and wherein said ether is selected from dimethyl ether, methylethyl ether, diethyl ether and mixtures thereof.

30. The process of claim 28, wherein the oxidizable reactant is a mixture of methanol and dimethyl ether.

31. The process of claim 28 wherein the oxidizable reactant is liquid sulfur in either (1) monoclinic form and the process is conducted at a temperature of greater than about 95° C. to less than about 430° C.; or (2) rhombic form and the process is conducted at a temperature of greater than about 113° C. to less than about 430° C.

32. The process of claim 20 further including the step of generating the oxidizable reactant in situ.

33. The process of claim 32 further including the step of introducing an ammonium salt into the reactor and controlling the pH at a level sufficient to effect decomposition of the ammonium salt, thereby generating ammonia.

34. The process of claim 20, wherein said electrochemical cell further comprises a configuration for reactants and ionic conductive electrolyte to be pumped into said reactor at suitable flow rate and provides for synthesized product and by-product to flow out of said reactor.

35. The process of claim 20 wherein said mixture further comprises at least one buffering agent.

36. The process of claim 20, wherein said continuous-flow reactor is selected from the group consisting of continuous-stirred tank reactors, tubular reactors and stack cell reactors, and wherein said reactor provides a configuration for reactants and ionic conductive electrolyte to be pumped into said reactor at suitable flow rates and provides for synthesized product and by-product to flow out of said reactor.

* * * * *